United States Patent

Racca

[11] 3,869,238
[45] Mar. 4, 1975

[54] CANNELON AND STUFFED SPAGHETTI MOLDING APPARATUS

[76] Inventor: Terenzio Racca, c/o Jorge Newbery, no. 3261/63 St., Buenos Aires, Argentina

[22] Filed: Nov. 15, 1973

[21] Appl. No.: 416,271

[52] U.S. Cl. .................... 425/294, 425/301, 83/9
[51] Int. Cl. .................... A21c 11/04, A21c 11/24
[58] Field of Search .................. 425/294, 301; 83/9

[56] References Cited
UNITED STATES PATENTS

| | | | |
|---|---|---|---|
| 327,465 | 9/1885 | Spalding | 425/294 X |
| 347,971 | 8/1886 | Snyder | 425/294 |
| 1,479,569 | 1/1924 | Waida | 425/294 |
| 1,726,566 | 9/1929 | Icre | 425/301 |
| 2,053,375 | 9/1936 | Nicholas | 83/9 |

Primary Examiner—Francis S. Husar
Assistant Examiner—David S. Safran
Attorney, Agent, or Firm—Steinberg & Blake

[57] ABSTRACT

Tubes of dough enveloping a filling are formed by passing a pair of sheets with filling therebetween into the nip between a pair of rollers while simultaneously pressing the sheets into engagement with each other along parallel lines and cutting through the sheets where they are pressed into engagement with each other with the sheets being shaped between the successive lines into the form of a tube, and simultaneously with the formation of the several tubes, the latter are transversely cut through partially at regular intervals. The apparatus includes a pair of oppositely rotating rollers having pairs of circumferential engaging edges separated by grooves in which the dough is shaped into a tube while one of each pair of circumferential engaging edges is a cutting edge so as to bring about pressing of the sheets of dough into engagement with each other while they are simultaneously cut through to form the separate tubes in which the filling is enveloped. One of the rollers carries an axial cutting blade extending across its groove for cutting transversely into the tube, and the roller which carries the cutting blade has its groove extending inwardly beyond the cutting blade to define a gap therewith.

10 Claims, 4 Drawing Figures

PATENTED MAR 4 1975 3,869,238

CANNELON AND STUFFED SPAGHETTI MOLDING APPARATUS

BACKGROUND OF THE INVENTION

The present invention relates to an apparatus and method for manufacturing an edible product.

In particular, the present invention relates to an apparatus and method for forming an edible product in the form of a filling which is enveloped in a tube of dough. Such edible products are known as stuffed spaghetti, or cannelloni.

When such products are made according to presently known techniques, a considerable amount of time and labor are required, and the cost is undesirably high. Thus with presently known procedures it is not possible to achieve a high output at a relatively low cost, and a product of uniformly high quality cannot be achieved. Even where mechanical devices are used in connection with the manufacture of such products, considerable labor is still involved. For example if a tube of dough enveloping a filling is manufactured, it must be manually cut to the desired lengths, retarding the output in an undesirable manner and increasing the cost. Furthermore, where mechanical devices are used, crevices and corners thereof soon become plugged with bits of dough, flour, and the like, so that frequent cleaning is essential.

SUMMARY OF THE INVENTION

It is accordingly a primary object of the present invention to provide a method and apparatus which will avoid the above drawbacks.

In particular, it is an object of the present invention to provide a method and apparatus which make it possible to manufacture at low cost edible products of the above general type while maintaining a high quality.

It is in particular an object of the present invention to provide an apparatus which will prevent corners, for example, from becoming filled with paste, so that frequent cleaning is not required and a continuously operating apparatus with a high output is assured.

Also, it is an object of the present invention to provide a method and apparatus which make it possible to cut the tubes at regular intervals, greatly facilitating the separation of the tubes into predetermined lengths.

In addition it is an object of the present invention to provide an apparatus which is relatively simple and rugged and which will operate very reliably to achieve the desired results.

According to the invention the apparatus includes a pair of rollers having parallel axes and having pairs of peripheral edges which engage each other in planes which are parallel and perpendicular to the roller axes, one of each pair of engaging edges being a cutting edge while the other is an anvil against which the cutting edge presses. Between these edges each roller is formed with a groove, so that the two grooves form an opening of a given configuration in a plane containing the roller axes, with this opening extending across the line of contact between the peripheral edges. One of these rollers carries an axially extending blade which extends across its groove while the latter groove extends inwardly toward the axis of the roller to a greater distance than the axially extending blade so as to define a gap with the latter.

With the latter apparatus it is possible to perform the method of the invention according to which a pair of sheets of dough with a filling therebetween are fed along a predetermined path while being pressed into engagement with each other along a pair of parallel lines which are parallel to this path, with the sheets of dough being simultaneously cut through at the lines where they are pressed together to form in this way a tube which is filled with the filling, and simultaneously with the movement of the sheets along this path the tube which is formed in the above manner is transversely cut at least partially at regular intervals.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
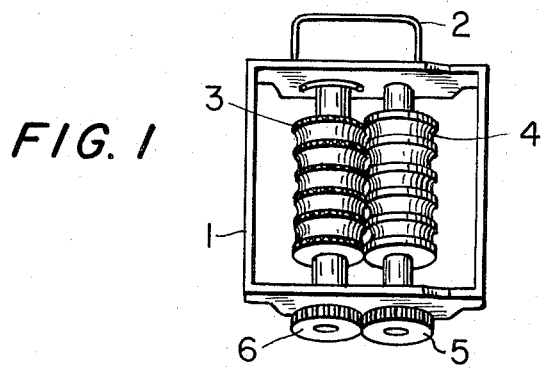
FIG. 1 is a perspective view of an apparatus according to the invention.

Referring to FIG. 1, there is illustrated therein a hollow frame 1 of square or rectangular configuration. This frame 1 has opposed side walls, shown at the upper and lower ends of FIG. 1, and in these side walls are situated suitable bearings to support for rotary movement a pair of parallel rollers 3 and 4 which are illustrated in greater detail in FIG. 2. For convenience the frame 1 is provided with a handle 2. At the side of the frame 1 which is opposed to the handle 2, a pair of meshing gears 5 and 6 are located, these gears being fixed to the parts of the rollers 3 and 4 which extend through the bearings of the frame 1. Thus the rollers 3 and 4 are coupled to each other by way of the transmission means 5, 6 so that the rollers 3 and 4 are compelled to rotate simultaneously in opposite directions.

The frame 1 is introduced into an unillustrated machine where an unillustrated gear from an unillustrated transmission meshes, for example, with the gear 5 so as to rotate the latter and thus rotate the gear 6 and drive the pair of rollers 3 and 4.

Figure 2:
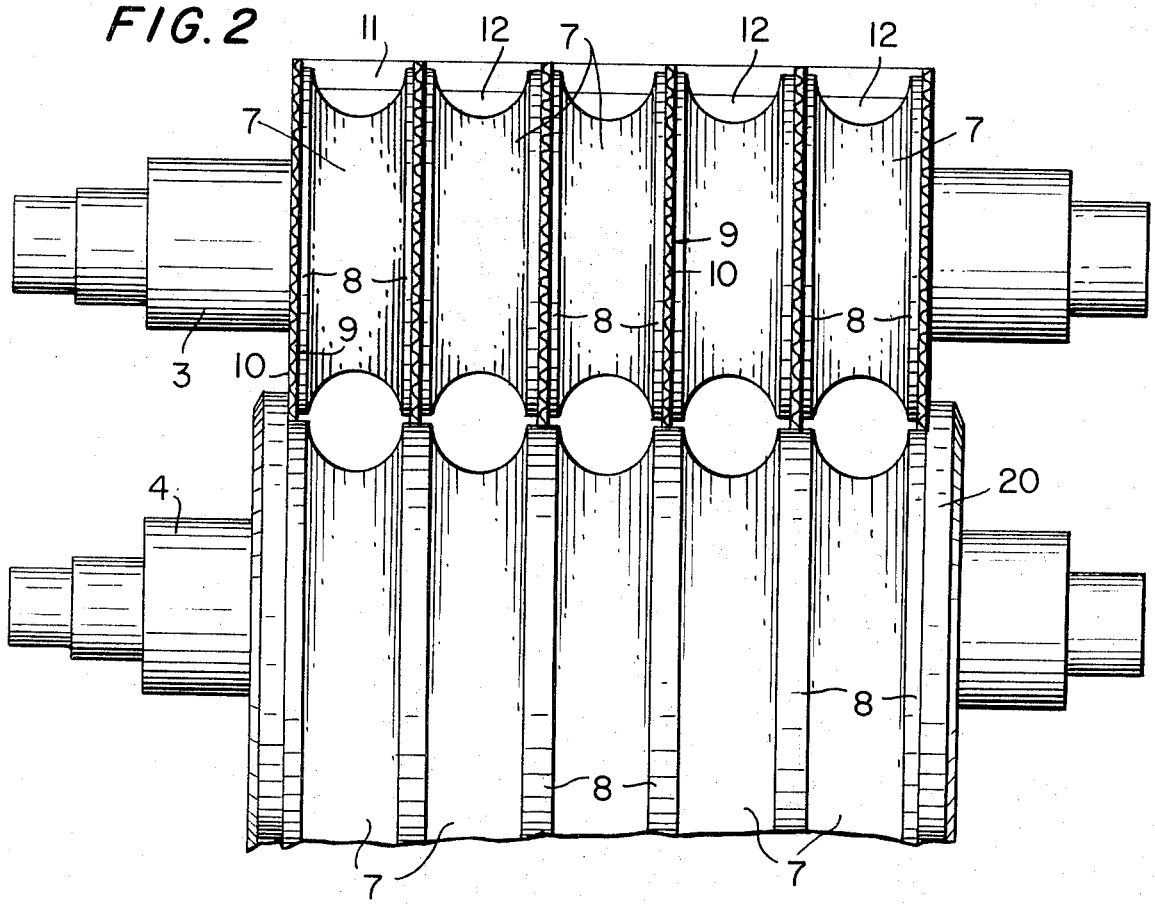
FIG. 2 is an enlarged partly fragmentary elevation of the rollers which form part of the apparatus shown in FIG. 1.

Referring now to FIG. 2, it will be seen that the rollers 3 and 4 have parallel axes. Each of the rollers is formed with a series of circumferential grooves 7, and the grooves 7 are separated by peripheral edges 8. In the illustrated example the several grooves 7 are of semicircular cross section and the peripheral or circumferential edges 8 are circular.

The roller 3 in the illustrated example carries at the peripheral edges 8 peripheral ribs 9 integral with the edges 8 and terminating in cutting edges 10 which are knurled or which have the wavy configuration illustrated. These circumferential cutting edges 10 press against the circumferential edges 8 of the roller 4, so that the edges 8 of the roller 4 act as anvil surfaces for the wavy cutting edges 10.

Thus, with the above construction the distance between the parallel axes of rotation of the rollers 3 and 4 is such that the cutting edges 10 engage the peripheral or circumferential edges 8 of the roller 4, and the grooves 7 of the rollers are in alignment with each other as illustrated so that each pair of aligned grooves 7 defines in a plane which contains the axes of rotation of the rollers 3 and 4 an opening of circular configuration extending across the line of contact between the rollers 3 and 4, this line of contact being situated in the plane which contains the axes of rotation of the rollers 3 and 4.

According to a further feature of the invention, an axially extending blade 11 is fixed to one of the rollers, the blade 11 being shown in the example of FIG. 2 fixed to the roller 3. The axially extending blade 11 extends parallel to the axis of the roller 3 and is fixed to the latter in any suitable way as by being situated in notches formed in the roller 3 to receive the blade 11 which is thus fixed in this way to the roller 3 for rotation therewith. The blade 11 has an outer cutting edge directed away from the axis of the roller 3 and situated at the same distance from this axis as the cutting edges 10. Thus, those portions of the blade 11 which project laterally beyond the cutting edges 10 will also engage the circumferential edges 8 of the roller 4 which thus act as an anvil for portions of the cutting edge of the blade 11. Thus, the outer cutting edge of the blade 11 will press against the edges 8 of the roller 4, extending axially across these edges 8 of the roller 4 and across the space therebetween.

It will further be noted that the blade 11 has an inner edge located closer to the axis of the roller 3 than the outer edge of the blade 11. This inner edge of the blade 11, in accordance with a further feature of the invention, is situated at a greater distance from the axis of the roller 3 than the central portion of each groove 7 which is located closer to the axis of the roller 3. In this way the blade 11 defines with each groove 7 a gap 12 having the configuration illustrated in FIG. 2.

Figure 3:
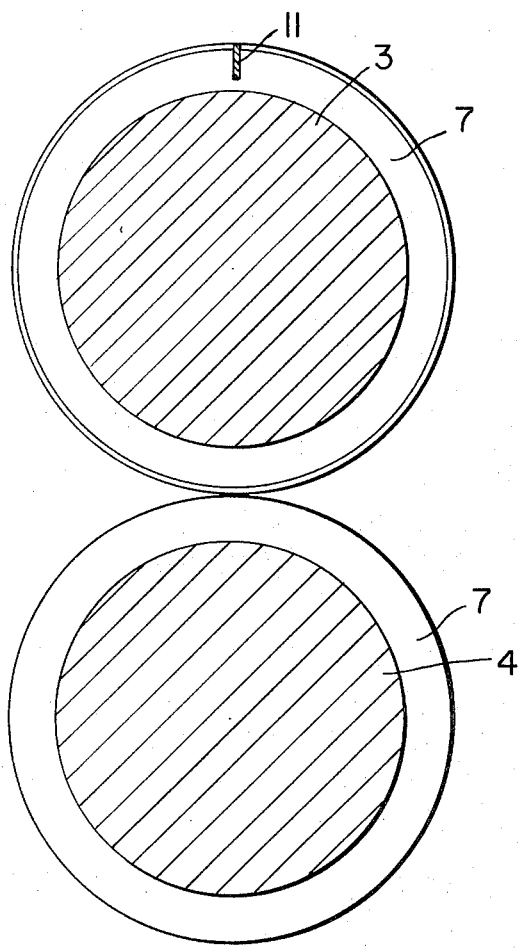
FIG. 3 is a transverse section of a pair of rollers as shown in FIG. 2.

Referring to FIG. 3, the manner in which the rollers 3 and 4 cooperate is further illustrated. Thus it will be seen that in the illustrated example a single blade 11 extends axially across each groove 7 of the roller 3 so that the blade 11 will act once during each revolution of the roller 3.

While in FIG. 3 the rollers 3 and 4 are shown as having equal diameters, in FIG. 2 the roller 4 is illustrated as having a somewhat larger diameter, although this inequality in the diameters of the rollers will make no difference in the operation. However it will be noted from FIG. 2 that the roller 4 has a pair of end flanges 20 between which the ends of the roller 3 are located with the ends of the roller 3 engaging the inner surfaces of the flanges 20 which are directed toward each other, so that in this way proper alignment between the pair of rollers 3 and 4 is assured.

Figure 4:
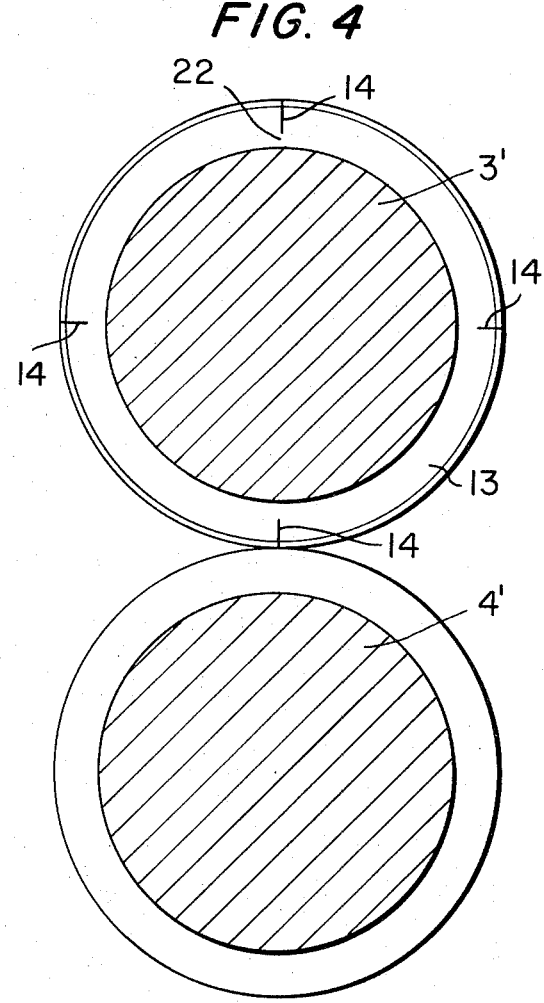
FIG. 4 is a transverse section of a similar pair of rollers provided with additional cutting blades.

Referring to FIG. 4, a pair of rollers 3' and 4' are illustrated. These rollers 3' and 4' may be identical with the rollers 3 and 4 except for the differences noted below. Thus it will be seen that in the case of FIG. 4 the rollers are formed with aligned grooves 13 separated also by pairs of engaging peripheral edges with the peripheral edge of one of the rollers such as the roller 3' having the ribs 9 and the cutting edges 10 as described above. However in the case of FIG. 4 the roller 3' instead of having a single blade 11, there are four blades 14 extending axially across each of the grooves 13 in the manner schematically illustrated in FIG. 4. These blades 14 are uniformly spaced circumferentially around the axis of the roller 3'. In the illustrated example the blades 14 are situated 90° one from the next, so that four cutting actions will be provided during each revolution of the roller 3'.

The grooves 13 may be made of a smaller size than the grooves 7 so that with the device of FIG. 4 it is possible to manufacture a product which has tubes of a smaller diameter, as will be apparent from the description below, and of course the greater number of blades 14 will provide shorter distances from one transverse cut to the next.

It is furthermore to be noted that in the embodiment of FIG. 4 the blades 14 do not extend throughout the entire depth of the grooves 13. With this embodiment also there remains a gap 22 between the inner edge of each blade 14 and the throat or innermost part of each groove 13.

The apparatus of the invention which has been described above may be used in the following manner, in accordance with a method of the invention. The filling of the stuffed spaghetti or cannelloni is initially situated between two sheets of dough. The two sheets of dough with the filling therebetween are fed into the nip between the rollers 3 and 4. The pairs of engaging edges of the rollers will press the sheets of dough into engagement with each other with the cutting edges 10 simultaneously cutting through the pressed-together sheets of dough so that in this way the sheets adhere to each other at each pair of peripheral engaging edges of the rollers 3 and 4. In this way from the two sheets of dough and the filling therebetween there are formed a plurality of tubes of dough with filling situated therein. The tubes assume a circular configuration because of the shapes of the grooves 7 or 13. In other words simultaneously with the pressing of the sheets into engagement with each other, and the cutting through of the sheets by the blades 10, the sheets are shaped by the grooves 7 or 13 so that each tube assumes the circular configuration of the openings formed at each pair of aligned grooves in the plane which contains the axes of the rollers 3 and 4, as described above. Therefore, a pair of sheets of dough with filling therebetween is fed into the rollers on one side thereof, and tubes of dough enveloping the filling material will issue from the other side, with these tubes being separated from each other. Suitable conveyors which are not illustrated can convey the sheets of dough with the filling therebetween into the nip between the rollers while additional conveyor belts or the like can receive the tubes as they issue from the rollers.

With the apparatus shown in FIGS. 2 and 3, the blade 11 will cut at its outer cutting edge into all of the tubes partly through the latter at each revolution of the roller 3. In this way the tubes of dough which issue from the rollers will have therein transverse cuts which facilitate separating the tubes into predetermined lengths. The tubes of dough with the filling therein and with the transverse cuts may then be baked or otherwise treated, and the separation of the tubes into the lengths determined by the blade 11 can take place either before or after the cooking or baking of the product which issues from the rollers.

In the case of FIG. 4, where the rollers may have a smaller diameter and the grooves 13 are shallower so that tubes of smaller diameter are provided, the apparatus will provide four transverse cuts during each revolution of the roller 3', so that in this way shorter stuffed tubes will be achieved, with the separation at the transverse cuts provided by the blades 14 also being made as desired before or after the cooking or baking.

It is particularly to be noted that because of the gaps 12 and 22 described above, the apparatus will remain clean. Thus if the blades 11 and 14 extended all the way through the depth of the grooves, corners would be provided in which bits of dough and flour would accumulate, rendering the operation less efficient and requiring much more frequent cleaning than is the case with the apparatus of the invention. However, because of the presence of these gaps 12 and 22 it is possible for the apparatus to continue to operate and for the method to be carried out continuously over as long a period as desired, without any undesirable plugging of the apparatus occurring and without necessitating cleaning of the apparatus. Thus any bits of dough or flour or other matter, such as filling material, which might otherwise accumulate can fall freely through the gaps 12 and 22, so that the apparatus remains clean and continues to operate efficiently.

What is claimed is:

1. In an apparatus for working on a deformable, compressible material, a pair of rollers respectively having parallel axes of rotation and respectively having pairs of peripheral edges situated in a pair of planes which are perpendicular to said axes, the peripheral edges of one of said rollers engaging the peripheral edges of the other of said rollers along a line of contact which is parallel to said axes and which is in a plane which contains said axes, each of said rollers being formed between its peripheral edges with a circumferential groove so that said grooves form in said plane which contains said axes an opening extending across said line of contact, so that said rollers provide in each of said planes perpendicular to said axes a pair of engaging peripheral edges, and one of each pair of peripheral engaging edges being a circumferential cutting edge while the other of each pair of engaging peripheral edges is a circumferential anvil surface to be engaged by the circumferential cutting edge, and one of said rollers carrying an axially extending cutting blade extending between the peripheral edges of the latter roller and having an outer cutting edge extending parallel to the axis of the latter roller and directed away from the latter axis, said axially extending cutting blade having an inner edge directed toward the latter axis and said groove in the roller which carries said cutting blade extending closer to the axis of the latter roller than the inner edge of said cutting blade to define a gap with said inner edge, and transmission means interconnecting said rollers for rotating one of the rollers in a direction opposite to the other of the rollers, so that a material fed between the rollers will be shaped in accordance with the configuration of the opening defined by the grooves in the plane which contains said axes of rotation and will be cut longitudinally at the peripheral engaging edges and transversely by said axially extending blade.

2. The combination of claim 1 and wherein both of said circumferential cutting edges are carried by the same roller.

3. The combination of claim 2 and wherein said axially extending cutting blade is carried by the roller which carries said circumferential cutting edges.

4. The combination of claim 1 and wherein said transmission means includes a pair of gears which mesh with each other and which are respectively fixed coaxially to said rollers.

5. The combination of claim 1 and wherein each circumferential cutting edge has a wavy configuration.

6. The combination of claim 1 and wherein said grooves are of a semicircular configuration to define a circular opening extending across the line of contact in the plane which contains said axes of rotation.

7. The combination of claim 1 and wherein the roller which carries said axially extending cutting blade carries at least one additional cutting blade so as to be provided with a plurality of said axially extending cutting blades, and the latter blades being uniformly distributed circumferentially around the axis of the latter roller.

8. The combination of claim 1 and wherein each roller is formed with a plurality of additional circumferential grooves and additional peripheral edges between which said grooves are located with all of the peripheral edges of one roller respectively engaging all of the peripheral edges of the other roller to form additional pairs of engaging peripheral edges, with one of each of the additional pairs of peripheral edges forming a circumferential cutting edge, and additional axially extending cutting blades respectively extending axially across each additional groove of at least one of the rollers.

9. The combination of claim 8 and wherein only one roller has all of said peripheral cutting edges and the other roller has all of the peripheral anvil edges engaged respectively by the peripheral cutting edges while the same roller which has the peripheral cutting edges carries a single elongated cutting blade extending across all of the grooves of the latter roller to form a cutting blade at each groove, all of the grooves of at least the roller which carries the single cutting blade being of a uniform depth and extending closer to the axis of the latter roller than the inner edge of the single cutting blade.

10. The combination of claim 9 and wherein a plurality of said cutting blades extend axially along the roller which carries the circumferential cutting edges, across all of the grooves thereof, with said plurality of cutting blades being uniformly distributed circumferentially about the axis of the latter roller.

* * * * *